US010580249B2

(12) United States Patent
Kogo

(10) Patent No.: US 10,580,249 B2
(45) Date of Patent: Mar. 3, 2020

(54) GAMING APPARATUS AND METHOD OF CONTROLLING IMAGE DISPLAY OF GAMING APPARATUS

(75) Inventor: Junichi Kogo, Tokyo (JP)

(73) Assignee: UNIVERSAL ENTERTAINMENT CORPORATION, Tokyo (JP)

( * ) Notice: Subject to any disclaimer, the term of this patent is extended or adjusted under 35 U.S.C. 154(b) by 1053 days.

(21) Appl. No.: 11/822,737

(22) Filed: Jul. 9, 2007

(65) Prior Publication Data

US 2008/0102948 A1 May 1, 2008

(30) Foreign Application Priority Data

Jul. 10, 2006 (JP) ................................ 2006-188751

(51) Int. Cl.
*A63F 13/00* (2014.01)
*G07F 17/32* (2006.01)

(52) U.S. Cl.
CPC ...... *G07F 17/3202* (2013.01); *G07F 17/3211* (2013.01)

(58) Field of Classification Search
CPC .................. A63F 13/06; A63F 13/2145; A63F 2300/1075
USPC ............................................... 463/27, 29, 31
See application file for complete search history.

(56) References Cited

U.S. PATENT DOCUMENTS 5,404,458 A * 4/1995 Zetts ...................... G06F 3/038 345/173
5,483,261 A * 1/1996 Yasutake ............... G06F 3/0425 178/18.03
5,543,591 A * 8/1996 Gillespie ................. G06F 3/038 178/18.03
5,559,301 A * 9/1996 Bryan, Jr. ............ G10H 1/0008 345/173
5,844,547 A * 12/1998 Minakuchi ............ G06F 3/0481 345/156
5,982,352 A * 11/1999 Pryor ........................ G01S 5/16 345/156
6,590,568 B1 * 7/2003 Astala ................... G06F 3/0486 178/18.01
6,921,336 B1 * 7/2005 Best ........................ A63F 13/10 463/32
6,958,749 B1 * 10/2005 Matsushita ........... G06F 3/0416 178/18.03
7,519,223 B2 * 4/2009 Dehlin .................. G06F 3/0354 345/173

(Continued)

FOREIGN PATENT DOCUMENTS

JP 2005-131298 6/2005
JP 2005-204754 8/2005

(Continued)

*Primary Examiner* — Steven J Hylinski

(74) *Attorney, Agent, or Firm* — Lex IP Meister, PLLC

(57) ABSTRACT

A gaming apparatus includes a display, a touch panel, and a controller. The touch panel is disposed so as to cover a display screen of the display, and outputs a position signal corresponding to a position touched by a player. The controller displays an image on the display, and moves the image based on the position signal on either one of conditions that the position signal is continuously received from the touch panel for a predetermined period of time and that the position signal is received from the touch panel a predetermined number of times.

8 Claims, 6 Drawing Sheets

(56) References Cited

U.S. PATENT DOCUMENTS

| | | | | |
|---|---|---|---|---|
| 8,164,573 | B2 * | 4/2012 | DaCosta | G06F 3/0418 178/18.01 |
| 2002/0015064 | A1 * | 2/2002 | Robotham | G06F 3/0481 715/863 |
| 2002/0018051 | A1 * | 2/2002 | Singh | G06F 3/0488 345/173 |
| 2002/0057263 | A1 * | 5/2002 | Keely | G06F 3/04883 345/179 |
| 2002/0112237 | A1 * | 8/2002 | Kelts | G06F 3/0481 725/39 |
| 2002/0113779 | A1 * | 8/2002 | Itoh | G06F 3/0414 345/173 |
| 2003/0016253 | A1 * | 1/2003 | Aoki | G06F 1/1626 715/863 |
| 2003/0160808 | A1 * | 8/2003 | Foote | G06F 3/0488 715/700 |
| 2004/0162669 | A1 * | 8/2004 | Nagamasa | G01C 21/20 701/455 |
| 2005/0024344 | A1 * | 2/2005 | Trachte | G06F 3/0202 345/173 |
| 2006/0025218 | A1 * | 2/2006 | Hotta | A63F 13/06 463/37 |
| 2006/0026536 | A1 * | 2/2006 | Hotelling | G06F 3/0418 715/863 |
| 2006/0089197 | A1 * | 4/2006 | Ajioka | A63F 13/06 463/31 |
| 2006/0097991 | A1 * | 5/2006 | Hotelling | G06F 3/0416 345/173 |
| 2006/0200778 | A1 * | 9/2006 | Gritzman | G06F 3/0481 715/781 |
| 2006/0252531 | A1 * | 11/2006 | Kando | A63F 13/10 463/30 |
| 2006/0258453 | A1 * | 11/2006 | Kando | A63F 13/10 463/36 |
| 2006/0267959 | A1 * | 11/2006 | Goto | G01C 21/3664 345/173 |
| 2007/0026937 | A1 * | 2/2007 | Yokoyama | 463/25 |
| 2007/0097096 | A1 * | 5/2007 | Rosenberg | G06F 1/1626 345/173 |
| 2007/0157089 | A1 * | 7/2007 | Van Os | G06F 3/04817 715/702 |
| 2008/0048990 | A1 * | 2/2008 | Cho | G06F 3/0416 345/173 |
| 2008/0274808 | A1 * | 11/2008 | Walker et al. | 463/31 |

FOREIGN PATENT DOCUMENTS

| | | |
|---|---|---|
| JP | 2005-211242 | 8/2005 |
| JP | 2006-146556 | 6/2006 |

* cited by examiner

FIG. 4

| POSITION SIGNAL | POSITION COORDINATE (X, Y) |
|---|---|
| 0000a | (240, 356) |
| 0000b | (250, 315) |
| ⋮ | ⋮ |

FIG. 5

| NAME OF IMAGE | POSITION COORDINATE (X, Y) |
|---|---|
| OPERATION WINDOW | (200, 215) |
| MAP (YAMAGUCHI PREFECTURE) | (260, 115) |
| MAP (SHIMANE PREFECTURE) | (290, 159) |
| ⋮ | ⋮ |

GAMING APPARATUS AND METHOD OF CONTROLLING IMAGE DISPLAY OF GAMING APPARATUS

CROSS REFERENCE TO RELATED APPLICATION

This application is based upon and claims the benefit of priority from the prior Japanese Patent Application No. 2006-188751, filed on Jul. 10, 2006, the entire contents of which are incorporated herein by reference.

BACKGROUND OF THE INVENTION

1. Field of the Invention

The present invention relates to a gaming apparatus using a touch panel, and also to a method of controlling image display of the gaming apparatus.

2. Description of Related Art

Japanese Unexamined Patent Publication No. 2006-146556 discloses an invention relating to an image display processing of a gaming apparatus. According to the above-mentioned document, only a part of a game image is displayed on a display screen of a display unit. As a player performs a drag operation on a touch panel, a region of the game image displayed on the display screen is shifted accordingly. This can improve operability because a troublesome operation is not necessary.

SUMMARY OF THE INVENTION

According to the above-mentioned document, a shift distance of a displayed region is determined in accordance with a shift distance between touched points. Here, the touched point means a point on the touch panel at which a player touches. Therefore, with a larger display screen for example, it may be necessary to increase a shift distance between the touched points. As a result, a player may feel troubled by an operation.

An object of the present invention is to provide a gaming apparatus that enables an image displayed on a display to be easily moved, and also provide a method of controlling image display of the gaming apparatus.

According to a first aspect of the present invention, there is provided a gaming apparatus comprising a display, a touch panel, and a controller. The touch panel is disposed so as to cover a display screen of the display and outputs a position signal corresponding to a position touched by a player. The controller displays an image on the display, and moves the image based on the position signal on either one of conditions that the position signal is continuously received from the touch panel for a predetermined period of time and that the position signal is received from the touch panel a predetermined number of times.

According to a second aspect of the present invention, there is provided a gaming apparatus comprising a display, a touch panel, an image display controller, a timer, a first determiner, and an image movement controller. The touch panel is disposed so as to cover a display screen of the display and outputs a position signal corresponding to a position touched by a player. The image display controller displays an image on the display. The timer measures a length of time during which the position signal is received from the touch panel. The first determiner determines whether a length of time measured by the timer has reached a predetermined period of time or not. When the first determiner determines that a length of time measured by the timer has reached the predetermined period of time, the image movement controller moves the image based on the position signal.

According to a third aspect of the present invention, there is provided a method of controlling image display of a gaming apparatus, wherein, while an image is being displayed on a display, the image is moved based on a position signal on either one of conditions that a controller keeps receiving the position signal for a predetermined period of time and that the controller receives the position signal a predetermined number of times. The position signal is outputted from a touch panel when a player touches the touch panel. The touch panel is disposed so as to cover a display screen of the display.

According to a fourth aspect of the present invention, there is provided a method of controlling image display of a gaming apparatus, comprising the steps of: displaying an image on a display whose display screen is covered with a touch panel; receiving a position signal from the touch panel; and moving the image based on the position signal on either one of conditions that the position signal is continuously received from the touch panel for a predetermined period of time and that the position signal is received from the touch panel a predetermined number of times.

According to a fifth aspect of the present invention, there is provided a method of controlling image display of a gaming apparatus, comprising the steps of: displaying an image on a display; receiving a position signal from a touch panel that is disposed so as to cover a display screen of the display and outputs a position signal corresponding to a position touched by a player; determining whether the position signal has been continuously received from the touch panel for a predetermined period of time or not; and moving the image based on the position signal when the position signal has been continuously received from the touch panel for the predetermined period of time.

In a case where the image is moved by means of a so-called “drag” operation, a longer dragging is required for moving the image to a larger extent. However, in the first to fifth aspect mentioned above, a player can easily move the image displayed on the display, merely by touching the touch panel for the predetermined period of time or touching the touch panel the predetermined number of times.

BRIEF DESCRIPTION OF THE DRAWINGS

Other and further objects, features and advantages of the invention will appear more fully from the following description taken in connection with the accompanying drawings in which:

FIG. 4 shows a coordinate transformation table to which reference is made when acquiring a touched position;

FIG. 5 shows an image position coordinate table to which reference is made when acquiring a position of an image displayed on the gaming apparatus;

DESCRIPTION OF THE PREFERRED EMBODIMENTS

In the following, a certain preferred embodiment of the present invention will be described with reference to the accompanying drawings.

Figure 1A:
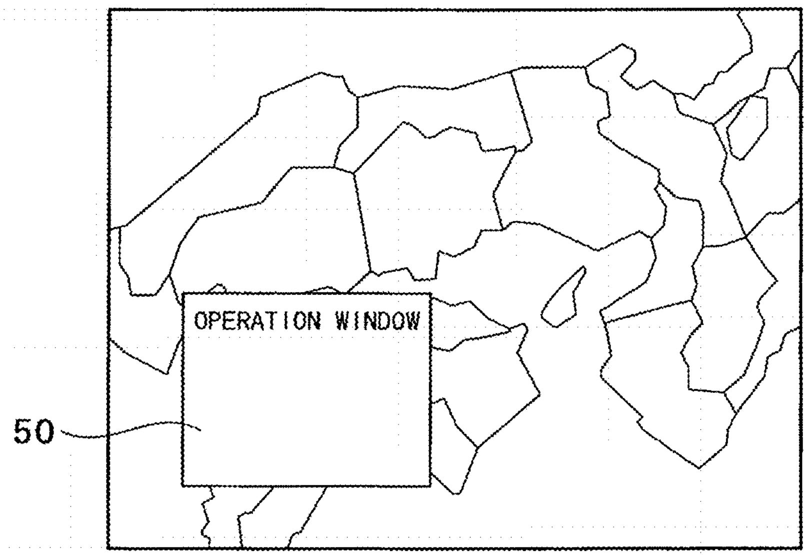
FIG. 1A illustrates a game screen that is displayed on a gaming apparatus according to an embodiment of the present invention.
Figure 1B:
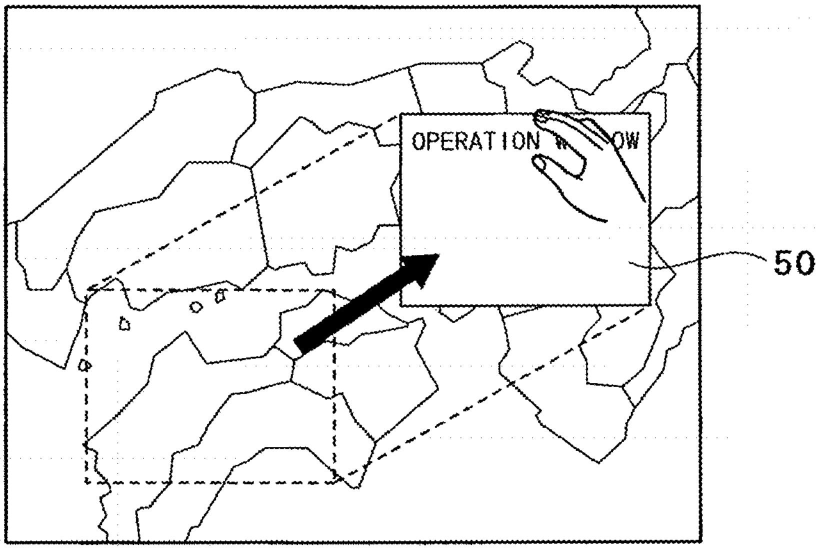
FIG. 1B illustrates that an operation window shown in FIG. 1A is moving.
Figure 2:
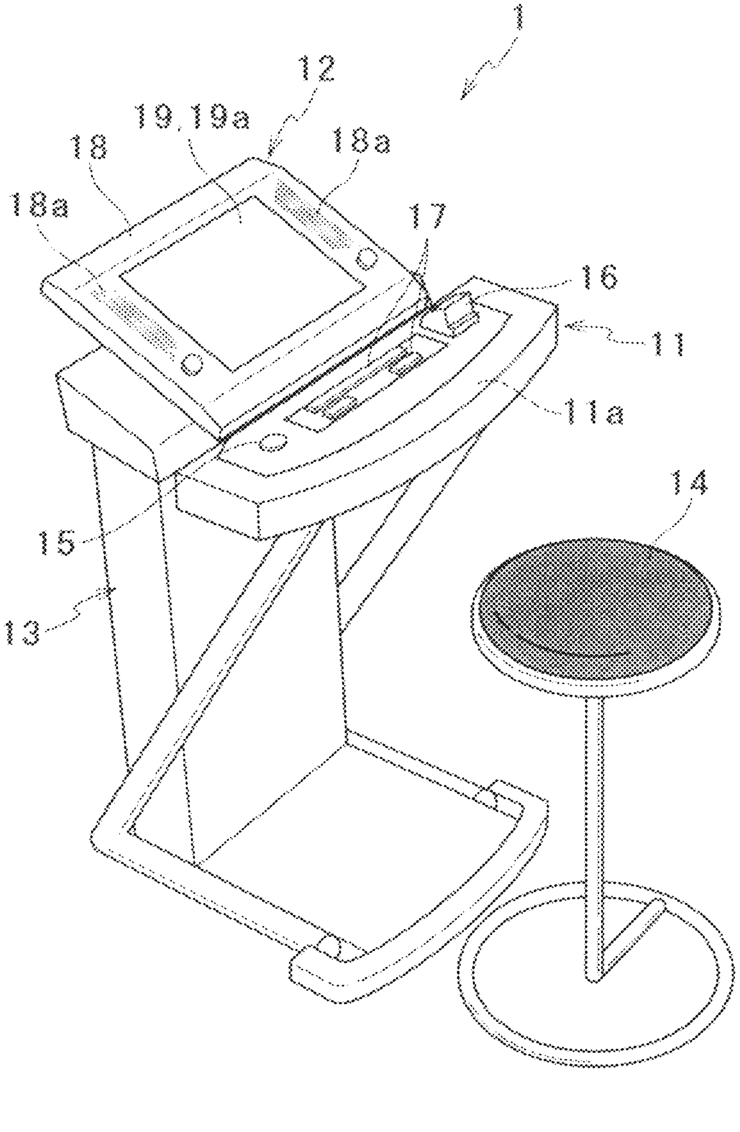
FIG. 2 is a perspective view of the gaming apparatus.

A gaming apparatus 1 of this embodiment has a touch panel (see FIG. 2). A game played in the gaming apparatus 1 is a card game for example, but no particular limitation is put thereon as long as it is a game playable with a touch panel. In a description given below, contents of a game will not especially be mentioned. As shown in FIGS. 1A and 1B, an operation window 50 is displayed on a screen backgrounded by a part of a map of Japan, and a player plays a game using the operation window 50.

First, a mechanical construction of the gaming apparatus 1 will be described. As shown in FIG. 2, the gaming apparatus 1 has a chair 14, a control panel 11, a display device 12, and a supporter 13. The chair 14, on which a player sits, is disposed on a front side. The control panel 11 is opposed to the chair 14. The display device 12 is disposed behind the control panel 11. The supporter 13 supports the control panel 11 and the display device 12.

Figure 3:
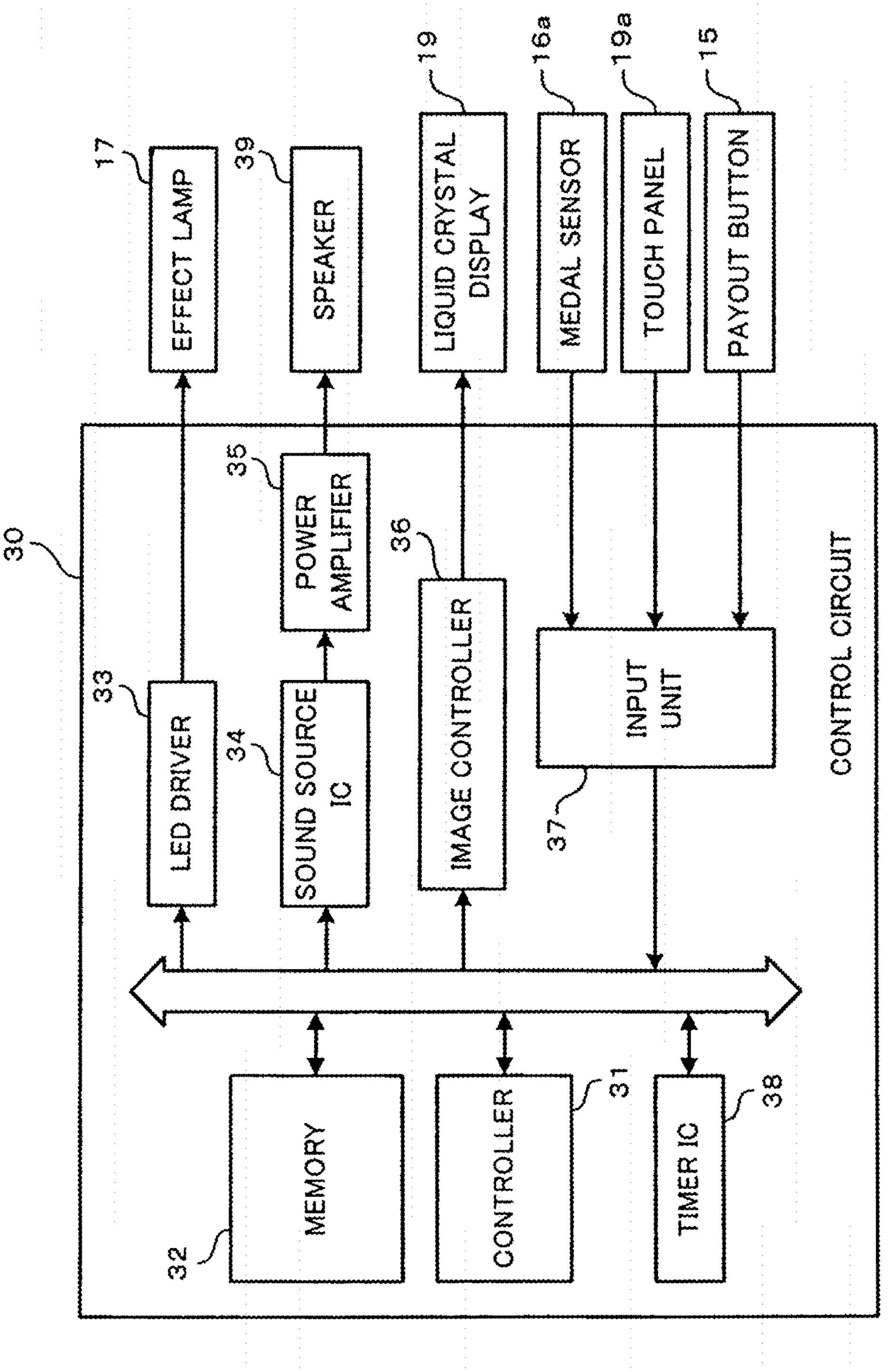
FIG. 3 is a block diagram showing an electrical construction of the gaming apparatus.

The control panel 11 includes a horizontal control surface 11*a*. A medal insertion slot 16, to which a medal used for playing a game is inserted, is provided at a right end (which means a far-side end in FIG. 2) of the control surface 11*a*. A medal sensor 16*a* (see FIG. 3) is provided in the medal insertion slot 16. The medal sensor 16*a* detects a medal and counts the number of medals inserted. A payout button 15 is provided at a left end (which means a side opposite to the medal insertion slot 16) of the control surface 11*a*. The gaming apparatus 1 is credited with medals which are paid out in accordance with a game result. Upon pressing of the payout button 15, the medals are paid out through a medal return opening (not shown). Medals credited to the gaming apparatus 1 are used in a next game. Various operation buttons and effect lamps 17 are provided between the payout button 15 and the medal insertion slot 16. The effect lamps 17 are turned on and off in accordance with a game result or game contents.

In order that a player sitting on the chair 15 can easily view the display device 12, the display device 12 is disposed so as to be inclined upward from its front end to its rear end with a height of its front end being at the same level as a height of the control panel 11. The display device 12 has a liquid crystal display 19, a touch panel 19*a*, and a support frame 18. The liquid crystal display 19 displays thereon an image relating to a game. The touch panel 19*a* is disposed so as to cover a display screen of the liquid crystal display 19. The support frame 18 supports the liquid crystal display 19 and the touch panel 19*a*.

The touch panel 19*a* is made of a transparent material, to allow a player to view through the touch panel 19*a* an image displayed on the liquid crystal display 19. Materials such as films, glass or the like, on which transparent conductive films are provided, are bonded to each other with the transparent conductive films being opposed to each other, to thereby form the touch panel 19*a*. When a player touches the touch panel 19*a* with his/her finger or the like, the transparent conductive films are bought into contact with each other and accordingly the touch panel 19*a* outputs a position signal that corresponds to a touched position. That is, when a player touches an image of a button or the like displayed on the liquid crystal display 19, a signal corresponding to the image is inputted through the touch panel 19*a*. Therefore, the player performs an input operation as if he/she were touching a real button.

Speaker grills 18*a* are formed on both sides of the support frame 18. Within the support frame 18, speakers 39 (see FIG. 3) are provided at positions corresponding to the speaker grills 18*a*. The speaker 39 outputs effect sound and the like during a game.

Next, an electrical construction of the gaming apparatus 1 will be described. A control circuit 30 shown in FIG. 3 controls an operation of the gaming apparatus 1. The control circuit 30 has a controller 31 and a memory 32. The controller 31 executes programs of various games that are executed in the gaming apparatus 1. The memory 32 stores therein the programs and various data.

The controller 31 includes a CPU (Central Processing Unit) and the like, and executes a later-described processing routine. The controller 31 displays a demonstration screen or a play screen for a game on the liquid crystal display 19, receives a position signal from the touch panel 19*a* to thereby acquire a position touched by a player, and the like. Specific functions and operations of the controller 31 will be described later with reference to FIG. 6.

The memory 32 unrewritably stores therein an application program for a game and a control program such as a processing routine. However, it may be possible that the gaming apparatus 1 stores therein the application program in a rewritable manner. This enables a player not only to play a predetermined game but also to play various games by downloading application programs of his/her favorite games from a management server (not shown) for example. In addition, it may also be possible that the gaming apparatus 1 stores therein the control program in a rewritable manner.

The memory 32 stores therein various data used in the control program, such as a coordinate transformation table shown in FIG. 4, an image position coordinate table shown in FIG. 5, and the like. In the coordinate transformation table, a position signal outputted from the touch panel 19*a* is associated with a coordinate of a position on the liquid crystal display 19. When a player touches the touch panel 19*a*, reference is made to the coordinate transformation table in order to acquire a touched position. In the image position coordinate table, data indicating a position of each image that is displayed on the liquid crystal display 19 are written. In order to acquire a position of each image, reference is made to the image position coordinate table. Data written in the image position coordinate table are rewritable, and rewritten by the controller 31 every time a display position of each image is changed.

The control circuit 30 also has an LED driver 33, a sound source IC 34, a power amplifier 35, and an image controller 36. The LED driver 33 drives the effect lamps 17. The sound source IC 34 controls sound in a game. The power amplifier 35 amplifies a sound signal from the sound source IC 34 and transmits it to the speaker 39. The image controller 36 controls the liquid crystal display 19. The image controller 36 includes an image control IC, an image control work RAM, an image ROM, and a video RAM, though they are not shown. In accordance with an image control program, the image control IC determines contents of display on the liquid crystal display 19 based on a parameter set by the controller 31. The image control work RAM functions as a buffer that temporarily stores therein data used when the image control IC executes the image control program. The image ROM stores therein dot data used for forming an image. The video RAM temporarily stores therein data used when the image control IC forms an image.

The control circuit 30 further has an input unit 37 and a timer IC 38. The input unit 37, which is connected to the medal sensor 16*a*, the touch panel 19*a*, and the payout button 15, converts a signal captured from these units into a signal suitable for data processing. The timer IC 38 counts a time within a certain period of time. To be more specific, the timer IC 38 counts a length of time during which a player keeps touching the touch panel 19*a*, a length of time during which a game is played, and the like.

Next, the coordinate transformation table shown in FIG. 4 will be described. The coordinate transformation table has a position signal field and a position coordinate field. Written in the position signal field is a value of a position signal that is outputted from the touch panel 19*a*. A value of a position signal may be a value of pressure applied to the touch panel 19*a*, or alternatively may be a value of voltage. Which one of a pressure value, a voltage value, and others should be adopted as a value of a position signal is appropriately changed depending on a kind of the touch panel 19*a*, and more specifically depending on whether the touch panel 19*a* is of optical coupling type, resistance type, contact type, magnetic coupling type, or the like.

Written in the position coordinate field are coordinate data associated with a position signal and indicating a position in the display screen of the liquid crystal display 19. Coordinate data have an X-axis coordinate and a Y-axis coordinate. In a display area of the liquid crystal display 19, a width is set as an X coordinate while a depth, which means a height, is set as a Y coordinate. An X-axis coordinate and a Y-axis coordinate of each image are determined on the basis of an origin, that is, on the basis of a point X=0, Y=0. The origin may be a center, an upper-left corner, or a lower-left corner of the screen.

Next, the image position coordinate table shown in FIG. 5 will be described. The image position coordinate table has an image name field and a position coordinate field. Written in the image name field are data about a name of an image that is displayed on the liquid crystal display 19. Written in the position coordinate field are coordinate data indicating a reference position of each image. When, for example, the operation window 50 is displayed as shown in FIG. 1A, "operation window" is written in the image name field, and coordinate data "(200, 215)" indicating a reference position of the operation window 50 are written in the position coordinate field. A shape and a size of the operation window 50 are written in other storage areas, respectively. Based on the shape and size, and also the reference position of the operation window 50 acquired from the image position coordinate table, a position of the operation window 50 as a whole is recognized.

Coordinate data written in the position coordinate field may be based on, for example, a center of each image or another portion of the image. To be more specific, in a case where the operation window 50 has a rectangular shape as shown in FIGS. 1A and 1B, a coordinate of an upper left end of the rectangular shape may be written in the position coordinate field, or alternatively a coordinate of a center of the rectangular shape may be written in the position coordinate field.

Next, an operation of the gaming apparatus 1 will be described. The gaming apparatus 1 executes the game program stored in the memory 32 to thereby display a game screen including the operation window 50 for example as shown in FIG. 1A. A player can move the operation window 50 to a desired position.

A specific description will be given to an exemplary case where the operation window 50 is displayed in a lower left portion of the game screen as shown in FIG. 1A. If a player wants to operate the operation window 50 with his/her right hand or wants to view a portion hidden behind the operation window 50, he/she keeps touching a right-side portion of the screen for a predetermined period of time so that the operation window 50 moves to the touched portion as shown in FIG. 1B. In this way, the player can move the operation window 50 to a desired position.

Figure 6:
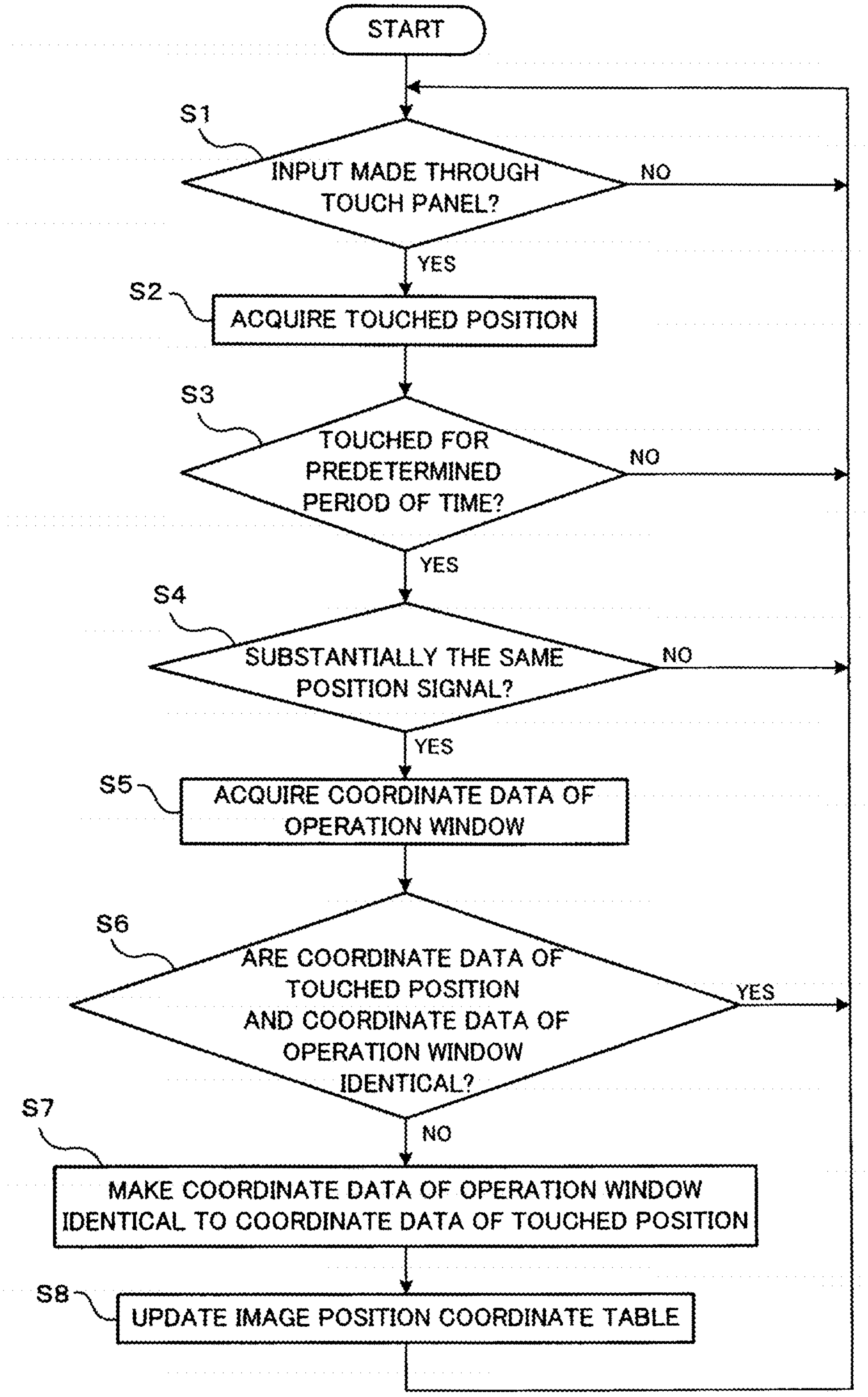
FIG. 6 is a flowchart showing an image control processing routine.

Here, an image control processing routine, which is executed by the controller 31 when moving the operation window 50, will be described in detail with reference to FIG. 6.

First, whether a player has made an input through the touch panel 19*a* or not is determined (S1). When a player has not made an input through the touch panel 19*a* (S1: NO), the step S1 is repeated until a player makes an input through the touch panel 19*a*. When a player has made an input through the touch panel 19*a* (S1: YES), that is, when a position signal is received from the touch panel 19*a*, a touched position is acquired based on the position signal (S2). More specifically, reference is made to the coordinate transformation table shown in FIG. 4 to thereby acquire coordinate data associated with the position signal outputted from the touch panel 19*a*. In this way, a position on the touch panel 19*a* touched by the player is recognized.

Subsequently, whether the player has touched the touch panel 19*a* for a predetermined period of time or not is determined (S3). More specifically, the timer IC 38 counts a length of time from when a position signal is outputted from the touch panel 19*a* to when outputting of the signal stops (hereinafter referred to as a touching time), and whether the touching time has reached a predetermined period of time pre-stored in the memory 32 or not is determined. When the player has not touched the touch panel 19*a* for the predetermined period of time (S3: NO), the processing returns to S1. Therefore, even if the player makes a momentary touch of the touch panel 19*a* by mistake, undesired movement of the operation window 50 can be prevented.

When the player has touched the touch panel 19*a* for the predetermined period of time (S3: YES), then whether substantially the same position signal has been outputted from the touch panel 19*a* for the predetermined period of time or not is determined (S4). That is, whether the player has touched substantially the same position on the touch panel 19*a* for the predetermined period of time or not is determined. Here, even when a touched position is changed during the predetermined period of time, it is determined that "substantially the same position" has been touched for the predetermined period of time as long as a degree of change of the touched position is within a tolerance that is pre-stored in a storage area such as the memory 32; and more specifically as long as a difference between values of coordinate data before and after change of the touched position is within a tolerance.

When position signals outputted from the touch panel 19*a* are not substantially the same (S4: NO), that is, when the touched position has been largely changed during the predetermined period of time, the processing returns to S1. When position signals outputted from the touch panel 19*a* are substantially the same (S4: YES), reference is made to the image position coordinate table shown in FIG. 5 in order to acquire coordinate data of the operation window 50 (S5).

Then, whether coordinate data of the touched position and the coordinate data of the operation window 50 are identical or not is determined (S6). When they are not identical (S6: NO), the coordinate data of the operation window 50 is made identical to the coordinate data of the touched position (S7). More specifically, a reference position of the operation window 50 is moved to the touched position as shown in FIG. 1B. Then, the image position coordinate table is updated (S8). More specifically, coordinate data that are written in the position coordinate field of the image position coordinate table and associated with the operation window 50 are updated. Then, the processing returns to S1.

When the coordinate data of the touched position and the coordinate data of the operation window 50 are identical (S6: YES), it is not necessary to move the operation window 50 and thus the processing returns to S1.

As thus far described above, in the gaming apparatus 1 of this embodiment, when a player keeps touching the touch panel 19*a* for a predetermined period of time, the operation window 50 displayed on the liquid crystal display 19 moves based on a position thus touched. In a case where the operation window 50 is moved by means of a so-called "drag" operation, a longer dragging is required for moving the operation window 50 to a larger extent. However, in the gaming apparatus 1, a player can easily move the operation window 50 merely by touching the touch panel 19*a* for the predetermined period of time.

The operation window 50 moves to a position on the touch panel 19*a* touched by a player. Thus, a player has only to touch a desired destination of the operation window 50, and therefore he/she can move the operation window 50 more easily and intuitively.

After the operation window 50 is moved, coordinate data that are written in the position coordinate field of the image position coordinate table and associated with the operation window 50 are updated. This makes it possible to always acquire an accurate current position of the operation window 50.

Figure 7A:
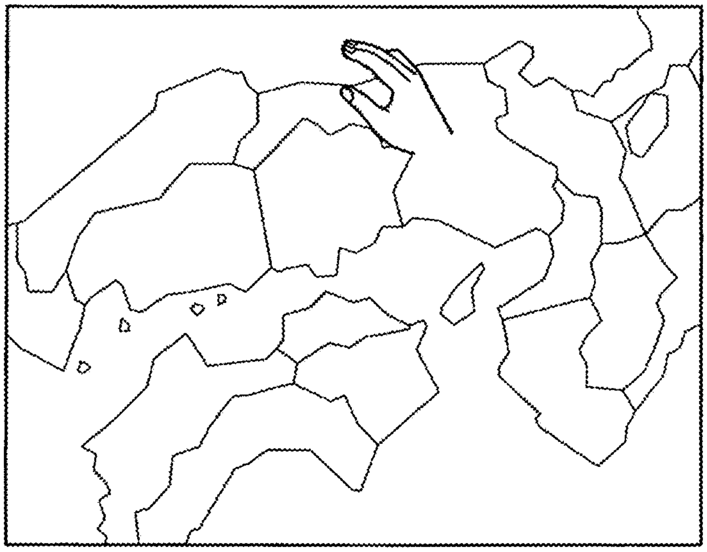
FIG. 7A illustrates a game screen that is displayed on a gaming apparatus according to a modification.
Figure 7B:
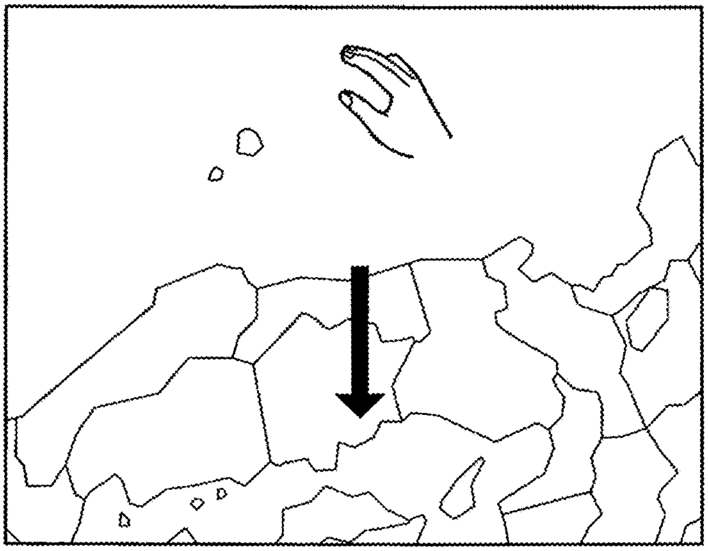
FIG. 7B illustrates that an operation window shown in FIG. 7A is moving.

In the above-described embodiment, the operation window 50 moves to a position on the touch panel 19*a* touched by a player. However, this is not limitative. For example, it may be possible that, when a player touches an upper portion of the display screen of the liquid crystal display 19 while an image as shown in FIG. 7A is appearing in the display screen, a whole of the image moves in an arrowed direction in FIG. 7B so that a portion of the image corresponding to a touched position comes to a center of the display screen of the liquid crystal display 19.

In the above-described embodiment, only one image which more specifically means only the operation window 50 moves based on a touched position. However, this is not limitative. For example, it may be possible that, in a case where several window images are displayed, a player firstly touches to select a window image intended to move and then touches a touch panel so that the selected window image moves based on a touched position.

In the above-described embodiment, the operation window 50 moves when a player keeps touching the touch panel 19*a* for a predetermined period of time. However, it may be possible that the operation window 50 moves when a player makes two quick touches of the touch panel 19*a*. That is, the operation window 50 may move when a player touches the touch panel 19*a* a predetermined number of times within a predetermined period of time so that the position signal is output from the touch panel 19*a* the predetermined number of times.

The touch panel 19*a* may detect at least two touched positions simultaneously and move an image in accordance with the number of positions touched by a player. For example, it may be possible that touching with one finger does not make an image move and touching with two fingers makes an image move. As a result, undesired movement of an image, which may be caused when a player mistakenly touches the touch panel 19*a*, can be suppressed.

It may be possible that the operation window 50 moves while a player keeps touching the touch panel 19*a*, and stops when the player removes his/her finger from the touch panel 19*a*.

The operation window 50 may move in a direction opposite to a touched position. That is, a relation between a touched position and a destination of an image can be appropriately changed.

In the above-described embodiment, the control circuit 30 functioning as a controller of the present invention includes the memory 32 in which various programs, the coordinate transformation table shown in FIG. 4, the image position coordinate table shown in FIG. 5, and the like are stored. However, the memory 32 may be provided outside the control circuit 30. For example, it may be possible that a memory card serving as the memory 32 in which programs and tables are stored is attachable to and detachable from a memory card connector that is provided directly in the control circuit 30 or a memory card connector that is disposed outside and electrically connected to the control circuit 30. In this case, the control circuit 30 may read data out of the memory card while the memory card is being mounted to the connector. This enables an operation of the gaming apparatus to be easily changed merely by replacing the memory card without necessity of replacement of the control circuit 30 or change of parts.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A gaming apparatus comprising:

a display that includes a display screen for displaying a plurality of images;

a touch panel that outputs a position signal corresponding to a touch position touched by a player; and a controller that receives a touch operation on any of the plurality of images displayed on the display, determines whether the touch position of the touch panel is touched during a predetermined period of time, and controls the display to change a display content of the display screen by moving a display position of a predetermined image, which has been previously determined without being selected by the player, to a desired position in accordance with the position signal received from the touch panel, thereby showing an image which has been hidden behind the predetermined image at a position different from the desired position, to the player, when detecting that a period of time during which the desired position of the touch panel is continuously touched reaches the predetermined period of time, the predetermined image being a movable image among the plurality of images.

2. The gaming apparatus according to claim 1, wherein the plurality of images further include an image which cannot be moved to the desired position.

3. The gaming apparatus according to claim 1, wherein in a case where the controller moves the predetermined image to the desired position corresponding to the touch position, the controller stops to move the predetermined image when the controller does not receive the position signal corresponding to the touch position.

4. A method of controlling image display of a gaming apparatus, comprising:

displaying a plurality of images on a display screen of a display;

receiving a position signal corresponding to a touch position from the touch panel when a touch operation of a player on any of the plurality of images displayed on the display is performed;

determining, by a controller, whether the touch position of the touch panel is touched during a predetermined period of time; and controlling, by the controller, the display to change a display content of the display screen by moving a display position of a predetermined image, which has been previously determined without being selected by the player, to a desired position in accordance with the position signal received from the touch panel, thereby showing an image which has been hidden below the predetermined image at a position different from the desired position, to the player, when detecting that a period of time during which the desired position of the touch panel is continuously touched exceeds the predetermined period of time, the predetermined image being a movable image among the plurality of images.

5. The method according to claim 4, wherein the plurality of images further include an image which cannot be moved to the desired position.

6. The method according to claim 4, further comprising, in a case where the predetermined image is moved to the desired position corresponding to the touch position, stopping to move the predetermined image when the position signal corresponding to the touch position is not received.

7. An image display apparatus comprising:

a display that displays a plurality of images including an operation window image which has been previously determined without being selected by the player;

a touch panel that outputs a position signal corresponding to a touch position; and a controller that receives a touch operation on the operation window image, determines whether the touch position of the touch panel is touched during a predetermined period of time, and controls the display to change a display content of the display by selectively moving a display position of the operation window image to a desired position in accordance with the position signal received from the touch panel, thereby showing another image which has been hidden behind the operation window image at a position different from the desired position, to the player, when detecting that a period of time during which the desired position of the touch panel is continuously touched reaches the predetermined period of time.

8. A gaming apparatus comprising:

a display that includes a display screen for displaying an image;

a touch panel that outputs a position signal corresponding to a touch position touched by a player; and a controller that receives a touch operation for inputting a desired position of a moving destination of the image, and controls the display to change a display content of the display screen by moving a display position of the image to the desired position of the moving destination in accordance with the position signal received from the touch panel when detecting that a period of time during which the desired position of the touch panel is continuously touched reaches a predetermined period of time, wherein the image includes an operation window image, and wherein the desired position of the moving destination is a position for allowing another image which has been hidden behind the operation window image at a position different from the desired position, to not be hidden by the operation window.

* * * * *